United States Patent
Strickland et al.

[15] 3,690,351
[45] Sept. 12, 1972

[54] LIMB REMOVING APPARATUS

[72] Inventors: Carl G. Strickland, P.O. Box 592, Port Gibson, Miss. 39150; Walter D. Clark, 1211 Lancaster Dr., Alexandria, La. 71301

[22] Filed: Oct. 5, 1970

[21] Appl. No.: 77,974

[52] U.S. Cl. .................................................144/2 Z
[51] Int. Cl. ...........................................A01g 23/02
[58] Field of Search.........144/2 Z, 3 D, 34 R, 208 R, 144/208 E

[56] References Cited

UNITED STATES PATENTS

| | | | |
|---|---|---|---|
| 1,539,603 | 5/1925 | Saprones | 144/208 E |
| 3,074,446 | 1/1963 | Earl | 144/2 Z |
| 2,802,497 | 8/1957 | Yeadon et al. | 144/208 E |
| 3,572,410 | 3/1971 | McElderry | 144/2 Z |
| 2,534,595 | 12/1950 | Hamilton | 144/208 E |
| 3,308,861 | 3/1967 | Hamilton | 144/3 D |

*Primary Examiner*—Gerald A. Dost
*Attorney*—E. Manning Giles and J. Patrick Cagney

[57] ABSTRACT

An apparatus for removing limbs from the trunk of a tree in which a hydraulically-activated compression ring operates to keep a segmented circular array of curved cutter blades in intimate branch-shearing contact with a tree trunk of variable size as said tree is fed endwise through the machine. The cutter knives are attached to the free ends of pivotally-mounted elongated support arms, and the compression ring is slidably attached to the outside of each of the support arms. The tree is pulled through the machine by hydraulically-powered, spiked rollers.

6 Claims, 6 Drawing Figures

PATENTED SEP 12 1972 3,690,351

INVENTORS
Carl G. Strickland
Walter D. Clark

BY J. Patrick Cagney ATTORNEY

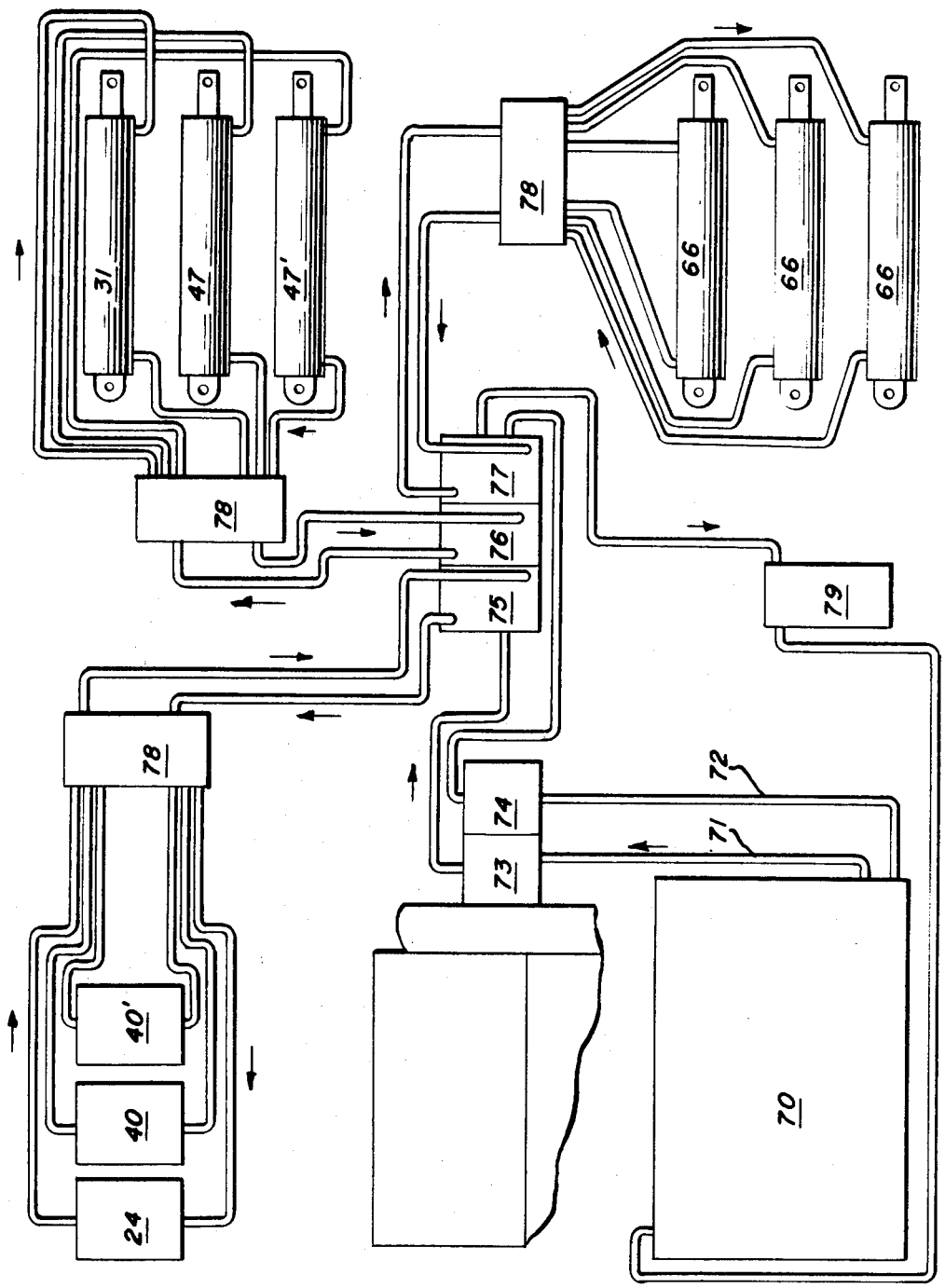

LIMB REMOVING APPARATUS

BACKGROUND AND SUMMARY OF THE INVENTION

This invention relates to the removal of limbs from the trunk of a tree. Known devices performing this function are characterized by having complex construction including many movable parts, as for example, machines that operate by having cutter blades rotate relative to the tree or by machines that cause the cutters to be forceably moved up the length of a stationary tree. In addition, prior devices are also characterized by having a limited ability to conform their cutting means to the varying circumference of a tree trunk; thereby failing to insure an effective and clean shearing of the branches off of the tree.

The present invention provides a tree branch-trimming machine of simple, but effective construction in which cutter blades operate to shear branches off of a tree without the need for relative rotational movement between the cutter blades and the tree and also without the need of a powerful force for moving the cutter blades along the tree trunk. Branches are removed from a tree by the action of a circular array of cutter blades on the tree as it moves transversely past the cutter blades which are stationary with respect to the longitudinal axis of the machine. The circumference of the array is variable over a large range of sizes; therefore, the blades can be kept in intimate contact with the trunk of a tree, even though the tree's circumference may vary greatly over its height. The tree is forced endwise through the machine by a feeding mechanism which continuously keeps a biting grip on the tree trunk and is powered to move the tree and limbs past the cutting array.

In accordance with the present invention, the cutting blades are freely mounted to act laterally to the trunk of a tree and are kept in intimate delimbing contact with the tree trunk through the action of a compression means. The compression means senses any tendency of the freely mounted cutter blades to conform to the changing shape of a tree and keeps the cutting blade array in intimate branch shearing contact with the periphery of a tree by continuously straining to hold the cutting blades against the tree trunk and providing the resistance necessary for the blades to be able to shear any branch off of the moving tree.

The tree limb removing machine according to this invention is of simple construction having a minimum of moving parts, yet provides an efficient and reliable mechanism for performing a limb-removing operation.

Other features and advantages of the invention will be apparent from the following description and claims and are illustrated in the accompanying drawings which show structure embodying preferred features of the present invention and the principles thereof, and what is now considered to be the best mode in which to apply these principles.

BRIEF DESCRIPTION OF THE DRAWINGS

In the accompanying drawings forming a part of the specification, and in which like numerals are employed to designate like parts throughout the same:

FIG. 5 is a fragmentary perspective view showing the attachment of the compression ring to the knife blade support arms; and FIG. 6 is a schematic of the hydraulic system of the embodiment of FIG. 1.

DETAILED DESCRIPTION OF THE PREFERRED EMBODIMENT

Figure 1:
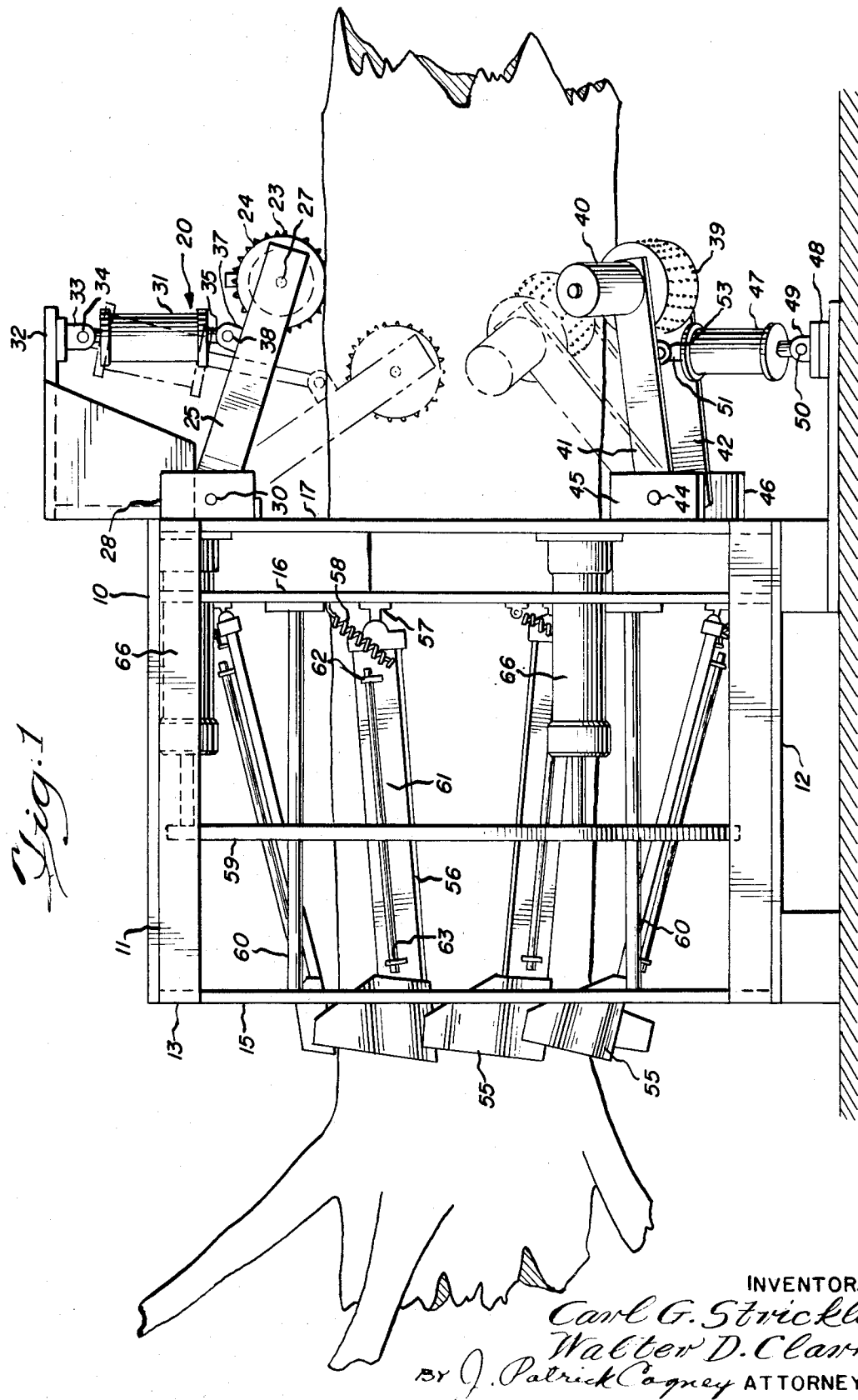
FIG. 1 is an elevational view of a tree limb removing machine constructed according to the present invention, including a tree having limbs to be sheared.

Illustrated in FIG. 1 is an exemplary machine for removing limbs from a fallen tree. The operative components of the machine are supported on a frame 10 including top beam 11, bottom beam 12, two top side beams 13 (only one shown) and two bottom side beams 14 (only one shown) which hold fast three vertical plates, a front plate 15, a center plate 16, and a rear plate 17. All three plates contain large circular openings having centers on the transverse axis of the machine. These openings are larger than the butt end of the largest tree to be delimbed by the machine. This frame construction causes the entire device to be one unitized piece which can be mounted in a trunnion (not shown).

Figure 2:
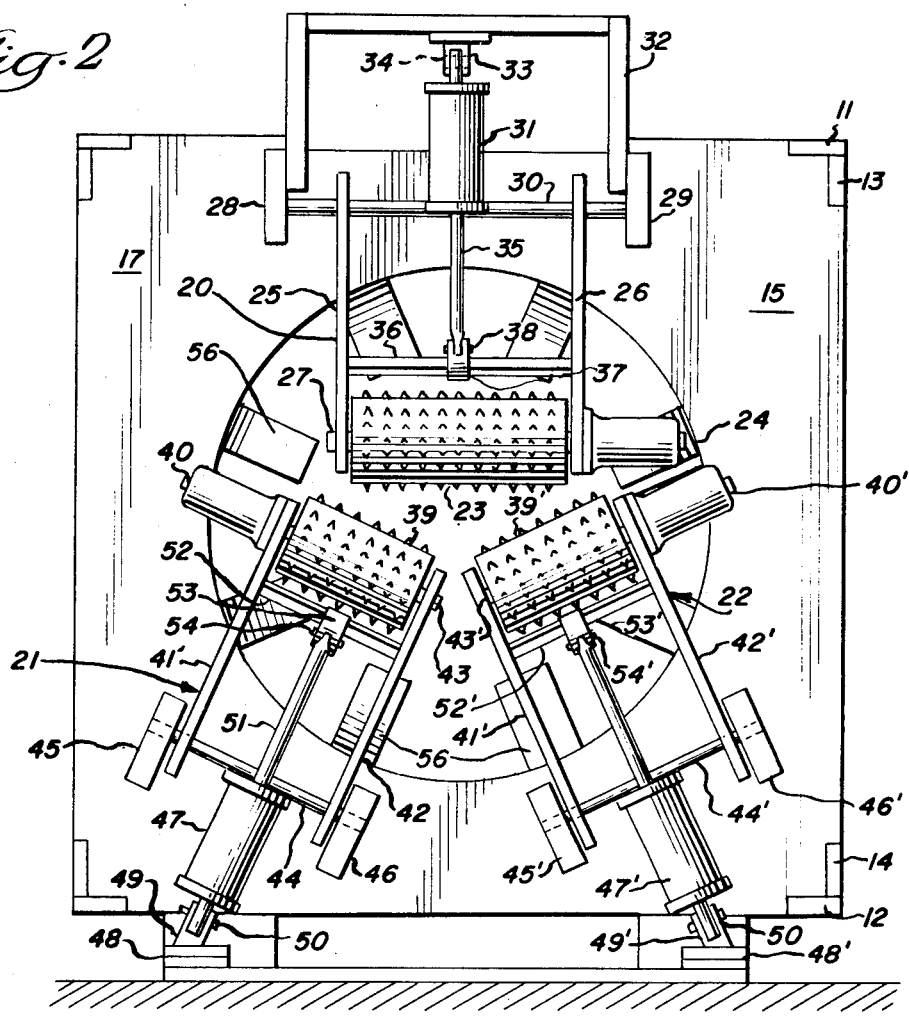
FIG. 2 is a rear view of the embodiment shown in FIG. 1.

A tree is inserted into the machine, butt end first, and is pulled through the machine by a feeding unit. As shown in FIG. 2, the feeding unit of the preferred embodiment is located at the rear of the machine and consists of three spiked roller assemblies 20, 21, and 22. These roller assemblies make biting contact with a tree to be delimbed and cooperate to pull it through the device. The roller assembly 20 is affixed at the top of the rear plate 17 at a point approximately on the extended vertical axis of the circular opening of the rear plate 17. The roller assemblies 21 and 22 are affixed at the bottom of the rear plate 17, each of approximately a 30° degree angle with the vertical axis of the circular opening of the rear plate 17.

The roller assembly 20 has the construction and operation shown in FIGS. 1 and 2. A cylindrical spiked roller 23 is powered by a hydraulic drive 24. The spikes allow the roller 23 to make biting contact with the tree. The roller 23 is rotatably attached at each end to elongated roller support arms 25 and 26 by a pin 27. The roller support arms 25 and 26 are, in turn, pivotally connected to fixed supports 28 and 29 on the rear plate 17 by a pin 30. In order for the spiked roller 23 to maintain constant feeding pressure on the tree while it turns, it is activated by a hydraulic cylinder 31 so that it moves along a circular path, as shown by the dotted lines in FIG. 1, as the diameter of the tree changes. The cylinder 31 is attached at one end to the top of a right angled support 32 appended to the rear plate 17 by a fixed clevis 33 and pin 34; while the cylinder's piston 35 is attached to a bar 36 extending between the roller support arms 25 and 26 by a movable clevis 37 and pin 38. The imaginary lines show the action of the hydraulic cylinder 31 on the spiked roller 23 as the tree gets smaller; the cylinder 31 extends its piston 35 and forces the spiked roller 23 to move downward to maintain biting contact with the tree.

The bottom roller assemblies 21 and 22 are identical in construction and operation, therefore, only the construction of the roller assembly 21 will be explained in detail and primed numbers will be assigned to duplicate parts of roller assembly 22. The roller assemblies 21 and 22 operate on the same principle as roller assembly 20, previously described. Roller assembly 21 includes a spiked roller 39 shorter than the spiked roller 23. The roller 39 is powered by a hydraulic drive 40, and is rotatably attached to elongated roller support arms 41 and 42 by a pin 43. The roller support arms 41 and 42 are, in turn, pivotally connected by a bar 44 rotatably mounted between supports 45 and 46 affixed to rear plate 17. A hydraulic cylinder 47 is used to pivot the spiked roller 39 and attached at one end to a support 48 by a fixed clevis 49 and pin 50. The piston 51 of cylinder 47 is attached to a bar 52 extending between the roller support arms 41 and 42 by a movable clevis 53 and pin 54. This construction allows the cylinder 48 to operate to move the roller 39 inward against the diminishing circumference of a tree and to maintain feeding contact with it.

Figure 3:
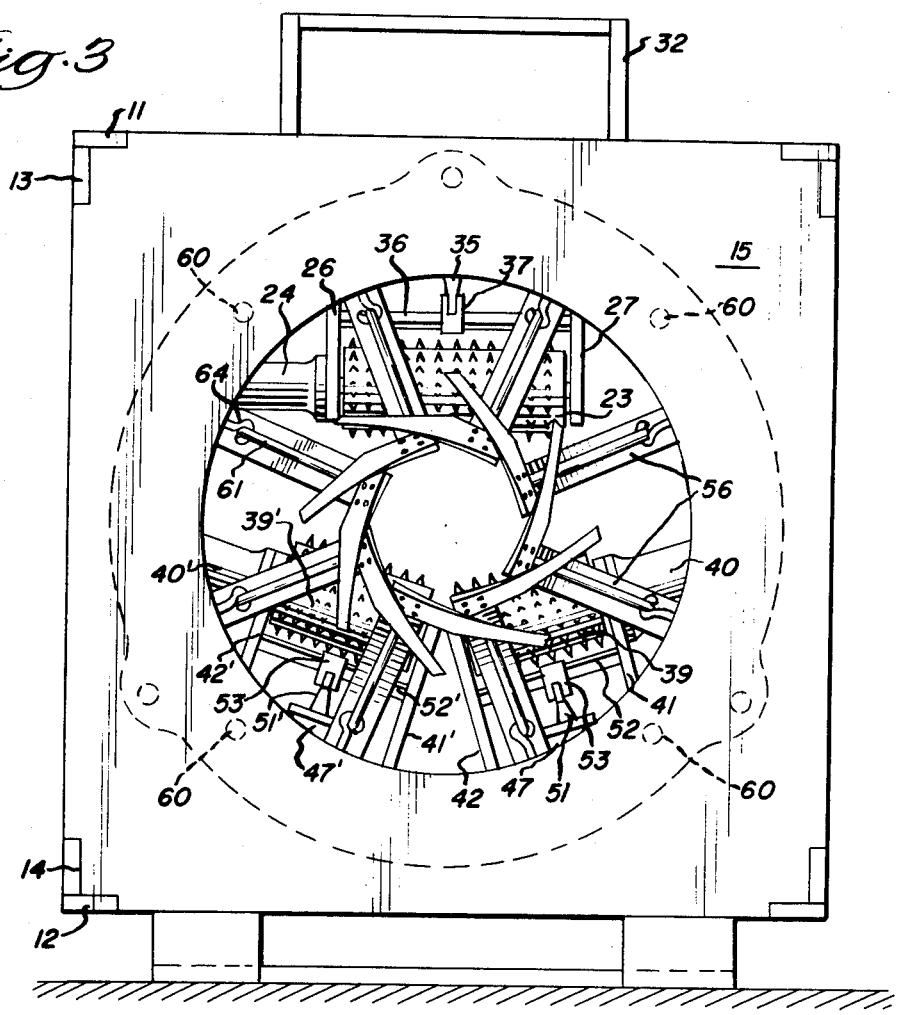
FIG. 3 is a front view of the embodiment shown in FIG. 1 showing the knife blade array with its smallest circumference.
Figure 4:
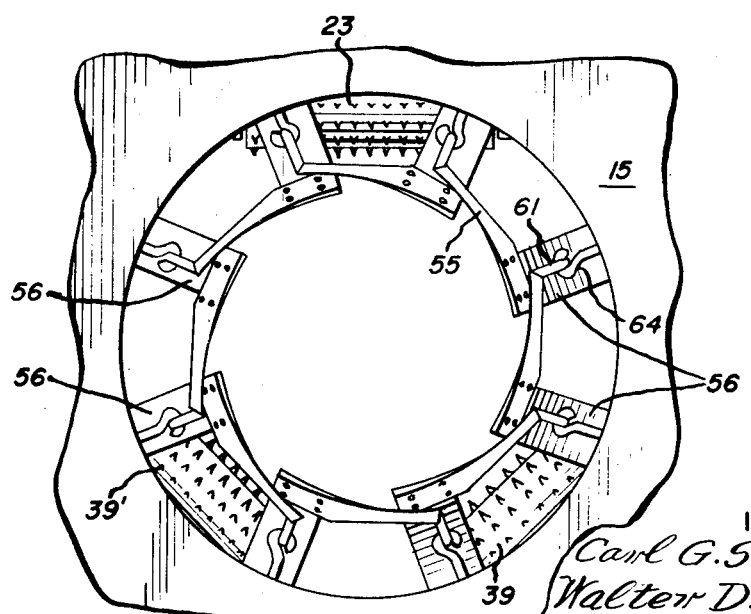
FIG. 4 is a fragmentary front view of the embodiment shown in FIG. 1 showing knife blade array with its largest circumference.

Limbs are removed from a tree by shearing action of knife blades acting on them as the tree is pulled bythe feeding assembly past a circular array of cutting blades. The machine includes eight knife blades 55 which are positioned so that they form a circular array. As shown in FIGS. 1, 3 and 4, the knife blades are attached to the apparatus by elongated knife support arms 56 which are each connected at one end by ball and socket joints 57 in an equiangular array about the periphery of the opening in the center vertical support plate 16. The ball and socket connection allows a support arm 56 to pivot in any direction so that the knife blade positioned at its other end can intimately contact the periphery of the tree. A tension spring 58, which limits a knife's range of movement, is attached between the rear of each support arm 56 and the center vertical plate 16.

The knives 55 are attached to the forward ends of the knife support arms 56. As shown in FIGS. 3 and 4, the knife blades 55 are somewhat curved in shape. The cutting edge of a blade 55 can be saw-toothed, so as to provide a reliable shearing edge.

A tree undergoing a delimbing operation in the machine constructed according to this invention must pass through the opening formed by the circular array of knife blades. The knives are mounted so as to sense any change in the perimeter of the tree and to remain in intimate contact with the trunk of the tree to provide effective shearing action.

As shown in FIGS. 1 and 5, a circular compression ring 59 is mounted for movement on a track structure formed by three members (only two shown) 60 each extending between the front plate 15 and the center vertical plate 16. The compression ring 59 is of greater diameter than the maximum opening of the knife array and is slidably attached to the outside of each knife arm 56, along a knife arm connecting support shaft 61, a longitudinal rod, which is connected to the outside of the knife arm 56 at each end by bearings 62 and 63. The compression ring 59 is connected to each knife arm connecting support shaft 61 by hooked connectors 64. The support shaft 62 is spaced from the knife arm 56 so as to allow the compression ring 59 to slide back and forth along the shaft 62.

Three hydraulic cylinders 66, (only two shown) are connected to the rear of the compression ring 59 by their pistons 67 at one end and fixed to the rear vertical support plate 17 at the other. The cylinders 66 go through the center plate 16 for extra support and reach. By action of the cylinders 66, the compression ring 59 is moved fore and aft. The action of the cylinders 66 on the ring 59 forces it to move into such a position so as to keep the knife blades in intimate contact with the tree trunk; it also provides the necessary cutting pressure.

When the compression ring 59 is in its rearward position, the circular array of knife blades 55 assumes its minimum diameter. Such position and knife blade configuration are illustrated in FIG. 3. In this position, only part of each curved knife blade 55 contributes to the cutting array. As the ring 59 moves forward, the opening becomes larger. When the compression ring 59 reaches its forwardmost position, the opening assumes its maximum diameter. This position and knife blade configuration are illustrated in FIG. 4. As shown in the figure, in this forwardmost position, the whole of each curved cutting blade is part of the cutting array. In the present embodiment of this invention, the diameter of the opening formed by the array of knife blades varies from a minimum of 4 inches to a maximum of 20 inches.

The elongated knife support arms 56 are mounted in an equiangular array outside the circular opening in the center vertical support plate 16. This particular mounting results in the knife support arms 56 being most nearly horizontal or parallel to each other when the diameter of the knife array is largest. In this position, the knife support arms 56 can provide the greater force necessary to shear the larger limbs occurring at the larger end of a tree.

The operation of the device herein described is controlled by a hydraulic system, shown in FIG. 6. Hydraulic oil is pumped from a supply tank 70 through two oil supply lines 71 and 72 to two tandem hydraulic pumps 73 and 74. The fluid is then pumped through pressure lines into control valves 75, 76 and 77. The fluid is then distributed through a diverter and regulator control 78 to the hydraulic systems existing in the unit as the need for the fluid arises. As noted earlier, the powered systems are the spiked roller drives 24, 40 and 40'; the hydraulic cylinders for pivoting the rollers 31, 47 and 47'; and the hydraulic cylinders for movement of the compression ring 66.

When the hydraulic fluid is forced out of a hydraulic cylinder, it is returned through the diverter and regulator control, through the control valves, and then passes through a filter 79 as it returns to the supply tank 70.

In operation, a tree is placed in the machine by conventional existing equipment such as a hydraulic loader. In an unactivated state, both the circular opening formed by the array of knife blades and the opening formed by the three spiked rollers 23, 39 and 39' are in their most relaxed position. Upon activation of the machine after placement of a tree in the unit, the hydraulic cylinders 31, 47 and 47' bring the spiked rollers 23, 39 and 39' into firm biting contact with the butt end of the tree, concurrently the hydraulic cylinders 66 act against the compression ring 59 to put the ring 59 into a position which forces the knife blades 55 into intimate contact with the tree. The hydraulic drives 27, 40 and 40' power the spiked rollers 23, 39 and 39' to turn and, therefore, pull the tree along the transverse axis of the machine without rotary motion.

Assuming in the operation of the delimbing apparatus that the butt or large end of the tree is placed into the machine, the hydraulic cylinders 31, 47 and 47' will operate to pivot the roller arms and consequently the spiked rollers 23, 39 and 39' into the tree as its trunk becomes smaller. In addition, as the tree becomes smaller, the knife blades will tend to pivot inwardly about their ball and socket connections 57 so that they can remain in contact with the tree. The compression ring 59 acting under the power of the hydraulic cylinders 66 senses the pivoting tendency of the knife blades 55, and the ring 59 is drawn rearwardly by the action of the cylinders; thereby, forcing the knives 55 into intimate shearing contact with the diminishing tree trunk. As the tree trunk is drawn through the machine, the knife blades which act basically along the trunk of the tree shear off all of the unwanted branches.

Thus, while preferred constructional features of the invention are embodied in the structure illustrated herein, it is to be understood that changes and variations may be made by those skilled in the art without departing from the spirit and scope of the appended claims.

What is claimed is:

1. An apparatus for removing limbs from a tree comprising: a main frame providing a through passage for endwise travel of the trunk of the tree; mounting arms pivotally attached to said frame and carrying power driven spiked rollers for radial movement relative to the tree trunk, means carried by said frame for loading said rollers into intimate contact with the tree trunk, power drive means for rotating said rollers to produce relative endwise movement between the tree trunk and main frame; a circular array of axially directed cutter blades having each blade mounted on one end of an elongated blade support arm which is pivotally connected at its other end to the main frame, said cutter blade array defines a cutting ring conformable to the shape of the tree trunk; and a power driven compression ring slidably attached to the outside of each of the pivotally-mounted blade support arms normally acting to move into a position to hold said cutter blade array against the tree trunk to conform the array to the size of the tree trunk for intimate delimbing contact.

2. Apparatus as in claim 1 wherein said compression ring is slidably attached to the pivotally mounted blade support arms along shafts attached to and extending lengthwise of the outside of each said elongated blade support arm.

3. Apparatus as in claim 1 wherein said power-driven spiked rollers and said power-driven compression ring are hydraulically operated.

4. An apparatus for removing limbs from a tree comprising: a cage-like main frame having a set of three vertical plates, a front plate, a center plate and a rear plate each plate having an opening so that a through passage for endwise travel of the tree trunk is provided; mounting arms pivotally attached to the outside of said rear plate and carrying power driven spiked rollers; means carried by said frame for loading said rollers into intimate contact with the tree trunk; power drive means for rotating said rollers to produce relative endwise movement between the tree trunk and main frame; a circular array of axially directed cutter blades having each blade mounted on one end of an elongated blade support arm which is pivotally connected at its other end to said center vertical plate, said cutter blade array defines a cutting ring conformable to the shape of the tree trunk; a lengthwise track structure carried by said main frame extending between said front plate and said center plate: a compression ring mounted for movement between end positions on said track structure and slidably attached to the outside of each of said pivotally-mounted blade support arms so that at one end position said cutting blade array has its maximum diameter and at the other end position said cutting blade array has its minimum diameter; hydraulic cylinder means connected at one end to said rear vertical plate, supported by said center vertical plate and attached to said compression ring at its other end, to move said compression means into a position to hold said cutter blade array against the tree trunk to conform the array to the size of the trunk for intimate delimbing contact.

5. Apparatus as in claim 4 wherein said blade support arms are substantially parallel to the trunk when said compression ring is at its end position wherein said cutting array is at its maximum diameter.

6. An apparatus for removing limbs from a tree comprising: a main frame providing a through passage for endwise travel of the trunk of the tree; power-driven feeding means carried by the main frame for biting engagement with the tree trunk to produce relative endwise movement between the tree trunk and the main frame; a circular array of axially-directed cutter blades with each cutter blade mounted on a separate elongated blade support arm having pivot means at one end connected to the main frame and carrying the knife blade on its free end for conjoint radially-shiftable movement to define a segmented cutting ring conformable to the shape of the tree; a compression ring slidably attached to each of said support arms; and power means operating on said compression ring to move it into position to conform the cutting array to the periphery of the tree for intimate delimbing contact.

* * * * *